July 2, 1940.  B. DICK  2,206,030

BRAKING MECHANISM

Filed Nov. 14, 1938  2 Sheets-Sheet 1

INVENTOR:
BURNS DICK
BY
HIS ATTORNEY.

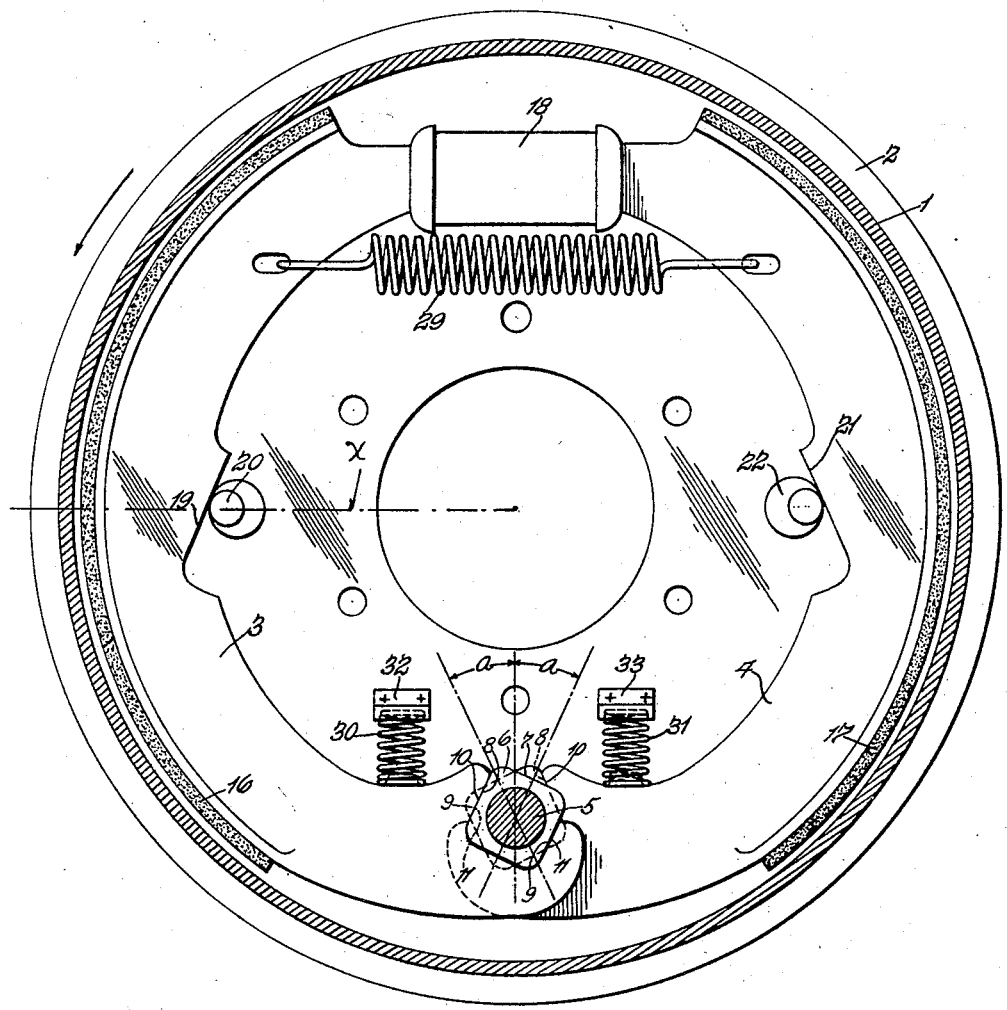

Patented July 2, 1940

2,206,030

UNITED STATES PATENT OFFICE 2,206,030

BRAKING MECHANISM

Burns Dick, Ferguson, Mo., assignor to Wagner Electric Corporation, St. Louis, Mo., a corporation of Delaware Application November 14, 1938, Serial No. 240,239

11 Claims. (Cl. 188—79.5)

My invention relates to braking mechanism and more particularly to the mounting of the brake shoe or shoes within the drum.

It has heretofore been proposed to so anchor one end of a brake shoe that said shoe is free to have a pivotal movement to engage and disengage it from the drum and to also have an automatic adjustment toward the drum at the anchored end to compensate for wear of the lining. However, in this brake construction the "off" position clearance between the lining at the free end of the shoe and the brake drum increases as the lining wears.

One of the objects of my invention is to provide means for association with a brake shoe of the type referred to whereby the end of the shoe will be automatically maintained at a predetermined distance from the drum when in "off" position, said means being operable as a result of the movement of the anchored end of the shoe toward the drum.

Still another object of my invention is to provide means whereby the retracting force applied to the shoe to return it to "off" position will not tend to cause the anchored end of the shoe to shift bodily relative to its pivot and away from the drum as the shoe assumes its "off" position.

Figure 1:
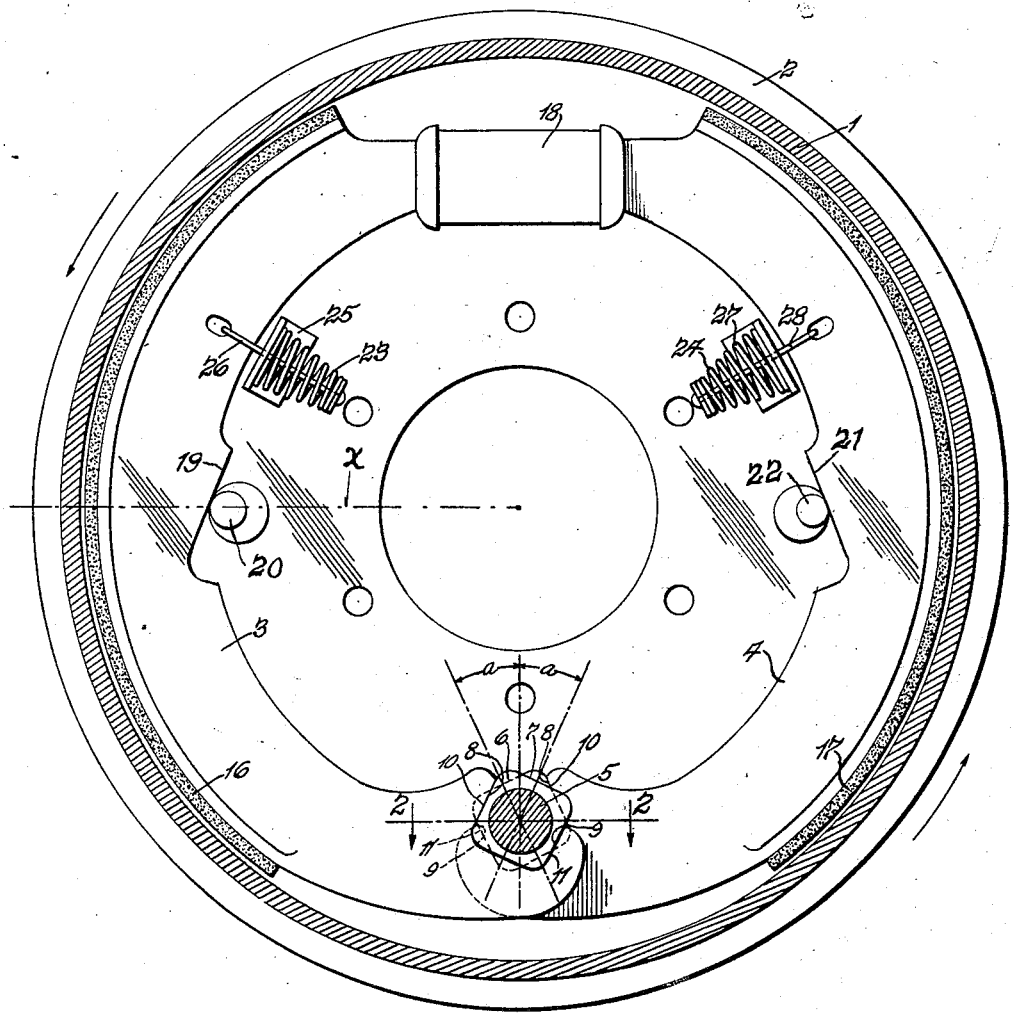
Figure 2:
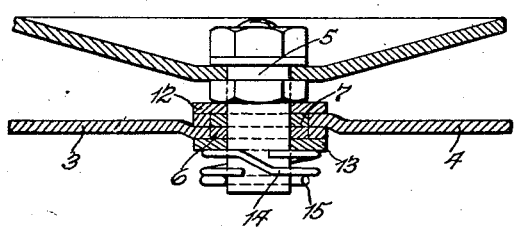

Other objects of my invention will become apparent from the following description taken in connection with the accompanying drawings in which Figure 1 is a view, partly in section, of a brake embodying my invention; Figure 2 is a cross-sectional view taken on the line 2—2 of Figure 1; and Figure 3 is a view similar to Figure 1, showing a modified construction.

Referring to Figures 1 and 2, numeral 1 indicates a brake drum which is fixed to the wheel of the vehicle and 2 the backing plate or support for the brake shoes 3 and 4, this backing plate closing the open side of the drum and being secured to some convenient fixed part of the vehicle, as for example, the axle housing. The backing plate on the lower side carries an anchor pin 5 and pivotally mounted thereon are two members 6 and 7 having parallel surfaces 8 and 9 formed thereon. The lower end of shoe 3 is formed with a notch or slot for receiving the member 6, the notch having parallel surfaces 10 and 11 for cooperation with the surfaces 8 and 9, respectively, of member 6. Similarly, the lower end of shoe 4 is provided with a notch or slot for receiving member 7, the slot also having parallel surfaces 10 and 11 for cooperation with the surfaces 8 and 9 on member 7. The surfaces 8 and 9 on members 6 and 7 and the cooperating surfaces 10 and 11 of the slots lie at an angle "a" with respect to a diameter passing through the center of the brake and the center of the anchor pin 5, this angle being preferably such as to cause the shoes to have an increased braking torque and smoother operation. The angle of the cooperating surfaces is also such as to cause each shoe to move transversely of the drum radius which bisects the shoe, indicated by the dash line "X" for shoe 3.

The ends of the shoes are maintained in position on members 6 and 7 by means of the washers 12 and 13 and the anchor pin carries a spring 14 for holding the lower ends of the shoes in frictional engagement with one another. A cotter pin 15 holds the spring in position. The shoes 3 and 4 carry linings 16 and 17 and the upper ends of the shoes are adapted to be expanded into engagement with the drum by means of a fluid motor 18 which is actuated by fluid under pressure from a suitable source.

When the fluid motor 18 in the type of brake just described is actuated to move the upper ends of the brake shoes into engagement with the drum, each shoe will pivot about anchor pin 5 and engage the drum in the same manner as it would if the block were eliminated and the shoe directly pivoted on the anchor pin as is common practice. If the drum is rotating in the direction indicated by the arrow, shoe 3 when engaged will have a force acting on its anchored end tending to move it toward the drum and in a direction corresponding to the cooperating surfaces 8 and 9, and 10 and 11. The force acting to move the lower end of the shoe toward the drum varies with the angle $a$ and is a component of the self-energizing force acting on the shoe. As the lining 16 of the shoe wears, the wear will be compensated for by an automatic adjustment of the anchored end of the shoe, this automatic adjustment being caused by the force tending to move the anchored end of the shoe toward the drum. The adjustment causes a relative movement between the surfaces 8 and 10, and 9 and 11 and since there is frictional engagement between the ends of shoes 3 and 4, the new position assumed by shoe 3 during the adjustment will be maintained. The adjustment is not disturbed by retraction of the shoe from the drum as the shoe during retraction acts the same as an ordinary pivoted shoe and only rotates about the anchor pin as it frees itself from the drum. When the drum is rotated in the opposite direction, shoe 4 will have the same action as shoe 3 and there will result an automatic adjustment of the anchored end of this shoe to compensate for the wear of lining 17.

Since each shoe, during the automatic adjustment, is moved outwardly toward the drum and in a direction corresponding to the direction of the surfaces 8 and 10, and 9 and 11, the upper or toe end thereof will consequently be moved downwardly away from the drum. This movement of the toe of the shoe, in addition to the wear of the lining over the entire shoe, causes a variable "off" position clearance between the shoe lining and the drum, especially at the end of the shoe unless some means are provided to keep the clearance substantially constant. In accordance with my invention, I have provided the central portion of shoe 3 with an inclined surface 19 for cooperation with the adjustable stop 20 carried by the backing plate. Also the central portion of shoe 4 is provided with an inclined surface 21 for cooperation with the adjustable stop 22 carried by the backing plate. Retractile springs 23 and 24 are provided for normally holding the shoes off the drum and the surfaces 19 and 21 in engagement with the adjustable stops 20 and 22. One end of the retractile spring 23 cooperates with the abutment 25 on the backing plate and the other end with a rod 26 passing through the coil of the spring and connected with the shoe. The spring is so positioned that the line of force acting on the shoe and tending to retract it from the drum is at right angles to the plane of surface 19 which cooperates with the adjustable stop 20. The retractile spring 24 for shoe 4 is of the same construction as the retractile spring 23 being interposed between the abutment 27 and the end of a rod 28 passing through the coil of the spring and connected to the shoe. The line of force of spring 24 tending to retract the shoe from the drum is at right angles to the plane of surface 21 cooperating with the adjustable stop 22.

The surface 19 on shoe 3 is so related to the direction of movement of the anchored end of the shoe determined by the surfaces 8 and 10, and 9 and 11 that as the lower end of the shoe moves outwardly toward the drum to perform the automatic adjustment to compensate for wear of the lining 17, the other portion of the shoe, when in retracted position, will also be moved outwardly toward the drum an amount such as to maintain the toe end of the shoe at substantially the same distance from the drum as it was prior to any adjustment at the anchored end of the shoe. In other words, the angle of surface 19 is such as to insure that all portions of the shoe and especially the toe end of the shoe, when the shoe is in its "off" position, will be so positioned as to maintain a substantially constant clearance between the lining and the drum throughout the life of the lining.

The surface 21 of shoe 4 bears the same relation to the direction of movement of the anchored end of said shoe determined by the cooperating surfaces 8 and 10, and 9 and 11 as that just described with respect to surface 19. Thus as the lining of shoe 4 wears and moves bodily downward during the automatic adjustment of the anchored end, all portions of the shoe will be maintained at a substantially fixed distance from the drum when the shoe is in retracted position.

By the provision of the inclined surfaces 19 and 21 on the shoes, the brake shoes will be automatically adjusted throughout the entire life of the lining and each shoe will have an "off" position clearance which will be substantially constant throughout the life of the lining. Furthermore, by having the toe end of the shoe adjusted simultaneously with the anchored end of the shoe, it will not be necessary for the toe end of the shoe to be moved an excessive distance to engage the shoe with the drum, thus preventing any slack from developing in the actuating system and consequently insuring that there will be a uniform pedal travel throughout the life of the lining.

Since the retractile springs 23 and 24 act on shoes 3 and 4, respectively, with a force which is in the direction at right angles to surfaces 19 and 21, there will be no force set up which will tend to effect the automatic adjustment of the anchored ends of the shoes.

The inclined surfaces 19 and 21 need not be placed at the central portion of the shoe as obviously they may be carried by the shoe at other points, it only being necessary that they have such relation to the movement of the anchored ends of the shoes that all portions of the shoes remote from the anchors will always be maintained at a substantially constant distance from the drums when the shoes are in retracted position.

It may be impossible in some brake assemblies, due to lack of space, to employ the type of retractile springs 23 and 24 shown in Figure 1. As shown in Figure 3, a retractile spring 29 may be employed between the upper ends of the shoes just below the actuating motor 18. The retractile force of this spring, of course, will not be at right angles to the inclined surfaces 19 and 21 on the shoes and, therefore, a force will be present tending to move the shoes upwardly. In order to insure that the adjustment of each shoe is not disturbed, I provide springs 30 and 31. Spring 30 acts downwardly on the anchored end of shoe 3, being interposed between the shoe and the abutment 32. Spring 31 acts downwardly on the anchored end of shoe 4, being interposed between said shoe and an abutment 33. The springs 30 and 31 are of such strength and act in such direction as to neutralize the force of the retractile spring 29 tending to shift shoes 3 and 4 upwardly.

Being aware of the possibility of other modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking apparatus, a brake drum and a brake shoe for cooperation therewith, said shoe being mounted at one end for pivotal movement into and out of engagement with the drum, means for automatically adjusting the "off" position of the pivoted end of said shoe with relation to the drum by a force effective on the shoe during braking application when the brake lining thickness at the pivoted end is reduced by wear, said adjusting means being so formed and positioned as to cause the shoe to move, when the pivoted end is adjusted toward the drum, transversely of the drum radius which bisects the shoe, and wear compensating means spaced from the pivoted end of the shoe and functioning as the result of the aforesaid transverse movement to adjust the free end of the shoe toward the drum.

2. In braking apparatus, a brake drum and a brake shoe for cooperation therewith, said shoe being mounted at one end for pivotal movement into and out of engagement with the drum, means for automatically adjusting the "off" position of the pivoted end of said shoe with relation to the drum by a force effective on the shoe during braking application when the brake lining thickness at the pivoted end is reduced by wear, said adjusting means being so formed and positioned as to cause the shoe to move, when the pivoted end is adjusted toward the drum, transversely of the drum radius which bisects the shoe, and wear compensating means associated with the shoe at a point spaced from the pivoted end for maintaining a substantially constant "off" position clearance between the drum and a portion of the shoe other than the pivoted end, said means operating as a result of the aforesaid transverse movement to adjust the free end of the shoe toward the drum.

3. In braking apparatus, cooperating rotatable and non-rotatable members one of which is provided with a friction surface, said non-rotatable member being mounted at one end for pivotal movement and also for automatic adjustment toward the drum as said friction surface wears, and wear compensating means comprising means located at a point spaced from the mounted end of the non-rotatable member and operating in response to the movement of the non-rotatable member which results in adjustment of the pivoted end of the non-rotatable member toward the rotatable member.

4. In braking apparatus, a brake drum, a brake friction element cooperating with the drum and mounted at one end for pivotal movement and also for automatic adjustment toward the drum as the friction surface of the mounted end of said element wears, an "off" position abutment for the friction element, and means for automatically advancing toward the drum the "off" position of the friction surface of the free end of said element relative to the abutment when the "off" position of the mounted end of the shoe is automatically adjusted toward the drum, said means comprising an inclined surface carried by the shoe at a point spaced from the mounted end and engaging said abutment when the shoe is in "off" position.

5. In braking apparatus, a brake drum, a brake friction element cooperating therewith, said element being mounted for engagement with the drum by pivotal movement, the pivoted end thereof being automatically adjustable toward the drum to compensate for lining wear, and wear compensating means comprising means located at a point spaced from the mounted end of the shoe and functioning to automatically advance the "off" position of the body of the shoe toward the drum when the "off" position of the pivoted end of the shoe is automatically adjusted toward the drum.

6. In braking apparatus, a brake drum and a brake shoe for cooperation therewith, said shoe being mounted at one end for pivotal movement and also for automatic adjustment at said end toward the drum as the shoe surface wears at said end, and wear compensating means operating in response to the movement of the shoe resulting from automatic adjustment of the pivoted end of the shoe toward the drum to automatically adjust the friction surface of another part of the shoe toward the drum.

7. In braking apparatus, a drum, a brake shoe having a lining thereon for cooperation with the drum, means for mounting one end of said shoe for pivotal movement and also for automatic adjustable sliding movement toward the drum as the lining wears, means for actuating the element about its pivotal axis, means forming an inclined surface on the shoe at a point spaced from its mounted end, and an abutment cooperating with the inclined surface when the shoe is in retracted position, said surface extending in substantially the same direction as the direction of sliding movement of the mounted end of the shoe and causing said shoe to have a predetermined "off" position clearance with the drum as the mounted end of the shoe moves toward the drum.

8. In braking apparatus, a drum, a brake shoe for cooperation with the drum, means for mounting one end of said shoe for pivotal movement and also for automatically adjusting movement toward the drum as the shoe wears, means for maintaining a substantially constant "off" position clearance between the shoe and drum, said means operating as a result of the movement of the mounted end of the shoe toward the drum and comprising an inclined surface associated with the shoe at a point spaced from the mounted end, and spring means associated with the shoe and producing a retracting force acting at substantially a right angle to the inclined surface and in a direction to move the shoe away from the drum.

9. In braking apparatus, a drum, a brake shoe for cooperation with the drum, means for mounting one end of said shoe for pivotal movement and also for automatic adjustment toward the drum as the lining wears, and means comprising an inclined surface so associated with the shoe at a point spaced from its mounted end and so related to the direction of movement of the shoe end that all portions of the shoe will be maintained at predetermined distances from the drum when in "off" position and a retracting spring acting on said shoe in a direction substantially at right angles to the inclined surface.

10. In braking apparatus, a drum, a pair of shoes provided with a lining for cooperation with the drum, means for mounting one pair of adjacent ends of the shoes for pivotal movement and for movement toward the drum as the lining wears, means for actuating the other adjacent ends of the shoes, means forming an inclined surface on each shoe, an abutment cooperating with each surface in the "off" position of the shoes, said inclined surface on each shoe being so related to the direction of movement of the mounted end of the shoe that a predetermined "off" position clearance will be maintained between said shoe and the drum as the mounted end of the shoe moves toward the drum, means for retracting the shoes from the drum, a retracting spring connecting the actuated ends of the shoes and producing force on each shoe tending to move said shoe relatively to its abutment when the inclined surface is in engagement therewith, and spring means acting on each shoe in a direction opposite to said force and with substantially equal magnitude.

11. In braking apparatus, a drum, a brake shoe for cooperation with the drum, brake shoe mounting and adjusting means for one end of the shoe and comprising means permitting pivotal movement of the shoe and means permitting adjustable sliding movement in a selected plane toward the drum to compensate for lining wear, and means for automatically advancing a portion of the shoe remote from the mounted end toward the drum as the said mounted end is adjusted, said means comprising an inclined surface associated with the shoe at a point spaced from the mounted end and extending in substantially the same direction as the selected plane of movement of the mounted end of the shoe.

BURNS DICK.